United States Patent Office 3,459,771
Patented Aug. 5, 1969

3,459,771
2,2,5-TRISUBSTITUTED-5-ISONITRILE-1,3-DIOXOLANES
Erwin Nikles, Alischwil, and Hans-Rudolf Hitz, Muttenz, Switzerland, assignors to Ciba Limited, Basel, Switzerland, a company of Switzerland
No Drawing. Filed Oct. 12, 1965, Ser. No. 495,338
Claims priority, application Switzerland, Oct. 14, 1964, 13,358/64
Int. Cl. C07d 15/04, 21/00; A01n 9/20
U.S. Cl. 260—340.7      2 Claims

ABSTRACT OF THE DISCLOSURE

New compounds are provided which are represented by the formula

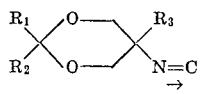

in which $R_1$ and $R_2$ each represents hydrogen or an unsubstituted or substituted alkyl, alkenyl, alkylene, cycloaliphatic, aromatic or heterocyclic group, and $R_3$ represents lower alkyl.

The compounds of this invention are especially useful as biocides more particuarly, as insecticides, acaricides, ovicides, herbicides, fungicides bactericides and molluscicides.

---

The present invention is concerned with new isonitriles and with their use.

The present invention provides compounds of the general Formula I

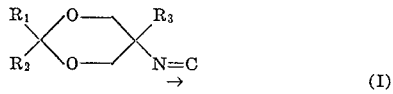   (I)

in which $R_1$ and $R_2$ each represents a hydrogen atom or an unsubstituted or substituted alkyl alkenyl, alkylene, cycloaliphatic, aromatic or heterocyclic group, and $R_3$ represents a lower alkyl group. The substituents which may be part of the groups represented by $R_1$ and $R_2$ may be of many different kinds; preferably, however, they are nonfunctional groups, for example halogen atoms, cyano groups or carbalkoxy group.

The new compounds of the Formula I have insecticidal, acaricidal, ovicidal, herbicidal, fungicidal, bactericidal and molluscicidal properties. Accordingly the present invention also provides a biocidal preparation which comprises a compound of the general Formula I in admixture or conjunction with a suitable carrier. The present invention further provides a method of treating living plants, wherein a plant is treated with a compound of the general Formula I.

The compounds of the Formula I can be prepared by the methods commonly used for the formation of isonitriles [cf. J. Ugi et al. Agnew. Chemie 77, 492–504 (1965)]. The following procedures are given by way of example: (a) by the elimination of water or $H_2S$ from the corresponding formamides or thioformamides, or (b) by reacting amines with chloroform and KOH, or (c) by reacting compounds containing the group $$-N=C=Z \qquad (II)$$

with organic phosphines of the formula $$P(R')_3 \qquad (III)$$

or (d) by reacting corresponding halides with silver cyanide and liberating the isonitrile from the resulting silver complex with an alkali cyanide.

Method (a) may be carried out in a variety of ways. As a rule, water is eliminated from the formamides with the aid of an inorganic or organic acid chloride (for example $POCl_3$, $SOCl_2$, $COCl_2$, benzene-sulphochloride or toluene-sulphochloride), if necessary, in the presence of a tertiary base (for example pyridine or triethylamine) and, if necessary, in an organic, anhydrous solvent, for example methylene chloride or chloroform.

The elimination of $H_2S$ from thioformamides is carried out in a similar manner. In this case, it is also possible, for example, to remove the $H_2S$ by means of halogenated cyanogens.

No comment is necessary on method (b) and the variations thereof, because the techniques are already known.

There are two ways of carrying out method (c): in one case Z may represent a sulphur atom and, in the other case, Z may represent two halogen atoms. R' in the phosphine of the Formula III may be an aliphatic, araliphatic, cycloaliphatic or aromatic group.

It is also unnecessary to comment on method (d) because it is a classical method.

The amines of the formula

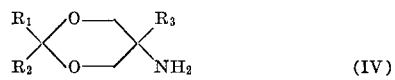   (IV)

which are used in many cases as intermediate products, are synthesized as follows:

A 2-nitro-2-alkyl-propane-1:3-diol is condensed under acid conditions with an aldehyde or a ketone to form the corresponding dioxan, the nitro group is reduced to an amino group and the latter is then formylated. Thus, 2-nitro-2-alkyl-propane-diols can be reacted with aliphatic aldehydes, for example, acetaldehyde, propionaldehyde, butyraldehyde, succinaldehyde, chloral chloracetaldehyde or sebacicaldehyde or with aliphatic ketones, for example acetone, diethylketone, methylethylketone or methylpropylketone, with aromatic or araliphatic aldehydes, for example benzaldehyde, chlorobenzaldehyde, cuminaldehyde, salicylaldehyde, cinnamaldehyde, dibromocinnamaldehyde or 2:4-dichlorophenoxy-acetaldehyde or with aromatic or araliphatic ketones, for example acetophenone, propiophenone or benzophenone, or with heterocyclic aldehydes or ketones, for example picoline-aldehyde, nicotine-aldehyde, isonicotine-aldehyde or pyrrolidine-aldehyde.

If the substituents $R_1$ and $R_2$ are not identical the compounds obtained are in the cic- and/or trans-form. Generally, both isomers are formed during manufacture and they can be separated by an appropriate operation, for example crystallization. However, it is also possible to employ the isomer mixtures for the various uses mentioned above.

Because of their extensive biocidal activity the new compounds have a special advantage in that they can be used for combating a very wide range of undesirable plant growth and a very wide variety of pests.

The biocidal preparations of the present invention are suitable for use not only as herbicides but also in the protection of plants when used in concentrations at which they have no phytotoxic action. This is because they are highly effective against harmful microorganisms, for example fungi such as *Alternaria solani, Phytophthora infestans* and *Septoria apii,* as well as against harmful aphids, insects, acarids and nematodes.

Furthermore, the preparations are also suitable for use as microbicides, for example, for combating species of aspergillus, as well as insecticides, for example, for combating midges, flies and the larvae thereof.

In the preparation of solutions of the compounds of the general Formula I that can be used directly as sprays, there may be used, for example, mineral oil fractions having a high to medium boiling range, for example diesel oil or kerosene, coal-tar oils and oils of vegetable or animal origin, as well as hydrocarbons such as alkylated naphthalenes and tetrahydronaphthalene, if necessary, in conjunction with xylene mixtures, cyclohexanols, ketones, and also chlorinated hydrocarbons such as trichloroethane, tetrachloroethan, trichloroethylene, trichlorobenzene and tetrachlorobenzene. It is advantageous to use organic solvents whose boiling point is above 100° C.

Aqueous preparations for application are advantageously prepared from emusion concentrates, pastes or wettable powders by dilution with water. Suitable emulsifying or dispersing agents are nonionic products, for example the products obtained by condensing aliphatic alcohols, amines or carboxylic acids having a long-chain hydrocarbon radical of about 10 20 carbon atoms with ethylene oxide, for example the condensation product of 1 mol of octadecyl alcohol with 25 to 30 mols of ethylene oxide, of 1 mol of soyabean fatty acid with 30 mols of ethylene oxide, of 1 mol of commercial oleylamine with 15 mols of ethylene oxide or that of 1 mol of dodecymercaptan with 12 mols of ethylene oxide. As the anionic emulsifier, there may be used the sodium salt of dodecylalcohol sulphuric acid ester, the sodium salt of dodecylbenzene-sulphonic acid, the potassium or triethanolamine salt of oleic acid or abietic acid or mixtures of these acids, or the sodium salt of a petroleum sulphonic acid. Cationic dispersing agents that may be used are quaternary ammonium compounds, for example cetylpyridinium bromide or dihydroxyethylbenzyldodecyl ammonium chloride.

Solid carrier substances suitable for use in the preparation of dusting and strewing preparations are talcum, kaolin, bentonite, calcium carbonate, calcium phosphate and charcoal, cork meal and wood meal and other materials of vegetable origin. It is also highly advantageous for the preparations to be in the form of granules. The preparations in their various forms can also be provided with the usual additives that improve dispersion, adhesion, penetration and resistance to rain; such substances are fatty acids, resins, glues, casein and alginates.

The compounds of the present invention may be used either alone or together with the usual pesticides, especially insecticides, acaricides, nematicides and bactericides or together with other fungicides or herbicides.

The following examples illustrate the invention. Unless otherwise stated, the parts and percentages are by weight.

EXAMPLE 1

(a) 2-(para-chlorophenyl)-5-methyl-5-nitro-1:3-dioxan

A mixture comprising 211 parts of para-chlorobenzaldehyde, 203 parts of 2-methyl-2-nitro-1:3-propanediol, 1,000 parts by volume of benzene, 1 part of anhydrous zinc chloride and 1 part by volume of concentrated phosphoric acid was boiled in a circulation distilling apparatus provided with a water separator. When the formation of water ceased, the hot solution was filtered and allowed to cool. The crystallized product was isolated by filtration and then recrystallized from toluene; M.P. 137 to 143° C.

(b) 5-amino-2-(para-chlorophenyl)-5-methyl-1:3-dioxan 200 parts of 2-(para-chlorophenyl)-5-methyl-5-nitro-1:3-dioxan were dissolved in 800 parts by volume of dioxan and then hydrogenated in the presence of 20 parts of Raney-nickel at about 30° C. and under atmospheric pressure. 54,000 parts by volume of hydrogen (normal conditions) were absorbed. The solution was filtered and evaporated. The residue was distilled in a high vacuum. Boiling point: 98–100° C./0.05 mm. Hg. The distillate crystallized when allowed to stand.

(c) 2-(para-chlorophenyl)-5-formylamino-5-methyl-1:3-dioxan 80 parts of 5-amino-2-(para-chlorophenyl)-5-methyl-1:3-dioxan and 300 parts by volume of ethyl formate were heated in autoclaves for 6 hours at 160° C. The solution was evaporated and the residue was crystallized from methanol. Melting point: 119 to 121° C.

(d) 2-(para-chlorophenyl)-5-isocyano-5-methyl-1:3-dioxan 17.4 parts of 2-(para-chlorophenyl)-5-formylamino-5-methyl-1:3-dioxane were dissolved in 75 parts by volume of dry pyridine. 6.5 parts of phosphorus oxychloride were then added dropwise while cooling with ice. The mixture was heated at 60° C. for 15 minutes and was then poured on to ice. The crystalline product was isolated by filtration, washed with water and recrystallized from methanol; melting point 115 to 116° C.

The following compounds were prepared in an analogous manner:

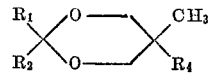

| Ex. | $R_1$ | $R_2$ | $R_4$ = $-NO_2$ | $-NH_2$ | $-NHCHO$ | $-N\equiv C$ |
|---|---|---|---|---|---|---|
| 2 | $CH_3$ | $CH_3-$ | Prepared according to the procedure described in J. Org. Chem. 21, 1175 (1956). | B.P. 62–64° C./12 mm. Hg. | B.P. 100–105° C./0.1 mm. Hg. | M.P. 64 to 65° C. (from cyclohexane). |
| 3 | H | $CH_3(CH_2)_3-\underset{\underset{C_2H_5}{\mid}}{C}H-$ | B.P. 103–108° C./0.05 mm. Hg. | B.P. 74° C./0.02 mm. Hg. | (*) | B.P. 88–93° C./0.12 mm. Hg. |
| 4 | H | $CH=CH-(CH_2)_5-$ or $CH_3(CH_2)_7-$ | B.P. about 150° C./0.06 mm. Hg. | B.P. 101–104° C./0.02 mm. Hg (double bond hydrogenated). | (*) | M.P. 64° C. (from methanol). |
| 5 | H | $R_3-\underset{\underset{CH_3}{\mid}}{\overset{\overset{CH_3}{\mid}}{C}}-CH_2-\overset{\overset{CH_3}{\mid}}{C}H$ | M.P. 64–86° C. (crude product). | B.P. 78–80° C./0.1 mm. Hg. | (*) | M.P. 70–72° C. (from cyclohexane). |
| 6 | $(CH_2)_5-$ | $(CH_2)_5-$ | M.P. 96–104° C. (from hexane). | B.P. 120–121° C./13 mm. Hg. | B.P. 135–143° C./0.04 mm. Hg. | M.P. 62–63° C. (from methanol). |
| 7 | H | (cyclohexyl) | B.P. about 110° C./0.03 mm. Hg. (crystalline). | B.P. 59–64° C./0.02 mm. Hg. | B.P. 133–141° C./0.03 mm. Hg. | M.P. 85–87° C. (from cyclohexane) stereoisomer mixture: B.P. 107–121° C./0.2 mm. Hg. |

| Ex. | R₁ | R₂ | R₄ —NO₂ | —NH₂ | —NHCHO | —N≡C |
|---|---|---|---|---|---|---|
| 8 | H | 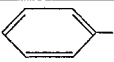 | B.P. 132–136° C./0.03 mm. Hg after separation of isomer melting at 119–120° C. by crystallization from benzene. | M.P. 75–80° C. (from cyclohexane). | M.P. 104–105° C. (from toluene). | M.P. 105–106° C. (from methanol). |
| 9 | H | 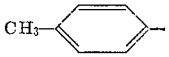 | M.P. 111–124° C. (from toluene). | B.P. 104° C./0.015 mm. Hg. | *Crystalline | M.P. 114–115° C. (from CCl₄). |
| 10 | H | 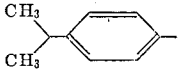 | M.P. 111–129° C. (crude product). | M.P. 53–59° C. (from hexane). | (*) | M.P. 73–76° C. (from hexane). |
| 11 | H | 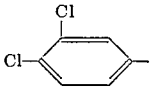 | M.P. 132–134° C. (from benzene). | B.P. 130–134° C./ 0.03 mm. Hg. | M.P. 110–112° C. (from toluene). | M.P. 109–110° C. (from alcohol). |
| 12 | H | 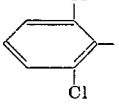 | M.P. 100–136° C. (from isopropanol). | M.P. 139–141° C. (from toluene). | B.P. about 200° C./ 0.12 mm. Hg. | M.P. 147–148° C. (from methanol), isomeric compound by crystallization from acetonitrile, M.P. 173–174° C. |
| 13 | CH₃ |  | B.P. 106° C./0.004 mm. Hg (crystalline). | B.P. 83–85° C./0.03 mm. Hg (crystalline). | M.P. 148–156° C. (from toluene). | M.P. 111–112° C. (from methanol/water). |
| 14 | H |  | M.P. 94–96° C. (from isopropanol). | B.P. 80–84° C./ 0.02 mm. Hg. | (*) | M.P. 80–81° C. (from toluene/cyclohexane). |
| 15 | H | 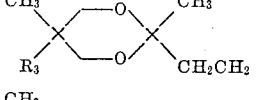 | M.P. 219–222° C. (from orthodichlorobenzene). | M.P. 95–126° C. (from acetonitrile). | (*) | M.P. 176–180° C. (from methanol). |
| 16 | H | 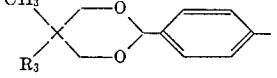 | M.P. 295–300° C. (from dimethylformamide). | M.P. 130–133° C. (from dioxan). | M.P. 238–244° C. (from dimethylformamide). | M.P. 261–262° C. (from dimethylsulphoxide). |

*Compound was not characterized more closely and was further processed as a crude product.

EXAMPLE 17

Cinnamaldehyde was reacted with 2-ethyl-2-nitro-1:3-propanediol to form 5-ethyl-5- nitro-2-(β-phenylvinyl)-1:3-dioxan in a manner analogous to that described in Example 1 (melting point 126 to 129° C. after crystallization from cyclohexane).

Hydrogenation with Raney-nickel yielded 5-amino-5-ethyl-2-(β-phenylethyl)-1:3-dioxan (B.P. 114 to 115° C./0.15 mm. Hg), which was converted into the corresponding isonitrile via the formamide. (M.P. 63 to 64° C., after crystallization from hexane).

Anisaldehyde, para-bromobenzaldehyde and meta-nitrobenzaldehyde can also be reacted with 2-ethyl-2-nitro-1:3-propanediol in an analogous manner. The corresponding isonitrile can be prepared from the compounds obtained via the amine and formamide step by the methods described.

EXAMPLE 18

A wettable powder that can be diluted with water to give aqueous spraying liquors can be prepared, for example, by finely grinding the following mixture: 20 parts of an active substance as described in any one of Examples 1 to 17, 50 parts of Bolus alba (kaolin), 25 parts of finely divided SiO₂ (obtainable under the tradename "Hisil"), 1.5 parts of the product obtained by condensing 1 mol of para-tertiary-octylphenol with 9 mols of ethylene oxide, 3.5 parts of sodium 1-benzyl-2-stearyl-benzimidazole-6:3′-disulphonate.

Emulsion concentrates can be prepared from soluble compounds in the following manner: 20 parts of an active substance are admixed with 30 parts of xylene and 10 parts of an emulsifier ("Toximul Q" of Ninol Corp. Chicago) consisting of a mixture of a nonionic and an anionic surface-active substance, and the mixture is bulked to 100 parts by volume with xylene. A clear solution is obtained that can be used as a concentrate for the preparation of a spray and that can be emulsified by pouring it into water.

EXAMPLE 19

Bush beans badly infested with red mites (*Tetranychus urticae*) were sprayed on all sides with a spray prepared by diluting the powder described in Example 18 which contained the active substance described in Example 12 (M.P. 147 to 148° C.). Assessment was made 7 days after the treatment. The results are shown in the following table (mortality in percent).

| Concentration of active substance | Effect (percent) on— | | |
|---|---|---|---|
| | Eggs | Larvae | Adults |
| 0.08 percent | 100 | 100 | 100 |
| 0.04 percent | 100 | 100 | 100 |

The same treatment applied to bush beans infested with *Tetranychus althae* also produced good results.

Similar results were obtained with the active principles described in Examples 1 and 11.

EXAMPLE 20

Clay pots were filled with soil in a greenhouse and the following seeds were sown in them: *Avena sativa, Setaria italica, Sinapis arvensis* and *Lepidium sativum*.

Pre-emergent treatment was carried out 1 day after sowing with the spray prepared in the manner described in Example 18 and which contained as the active substance the compound of Example 10. The rate of application was 10 kg. of active substance per hectare. Assessment was made 20 days after treatment. The post-emergent treatment of the said plants was carried out in the same manner, but 10 days after sowing when the plants were at the 2–3 leaf stage. The rate of application was 5 kg. of active substance per hectare. Assessment was made 20 days after treatment. The results are indicated in the following table:

| Test plants | Pre-emergent | Post-emergent |
|---|---|---|
| Avena sativa | 1 | 6 |
| Setaria italica | 7 | 10 |
| Sinapis arvensis | 10 | 10 |
| Lepidium sativum | 10 | 10 |

0=no effect. 10=plants destroyed.

EXAMPLE 21

The isonitrile described in Example 15 has a good microbicidal action on phytopathogenic fungi. For example, it was observed that a 0.2% concentration of active substance was 100% effective against *Septoria apii*, without any noticeable damage to the plants treated. Similar good results were obtained with the isonitriles described in Examples 11 to 16.

What is claimed is:
1. The compound of the formula

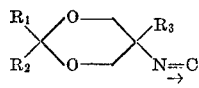

in which $R_1$ and $R_2$ are the same or different and each represents a member selected from the group consisting of hydrogen, alkyl having 1–10 carbon atoms, alkenyl having 1–10 carbon atoms, cyclohexenyl, phenyl, phenyl substituted with 1–2 members selected from the group consisting of halogen and lower alkyl, and furyl, $R_1$ and $R_2$ when attached to each other together represent pentylene, and $R_3$ represents lower alkyl.

2. The compound of the formula

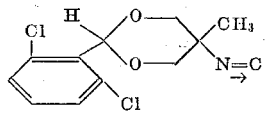

References Cited

UNITED STATES PATENTS 2,254,876   9/1941   Senkus _____ 260—340.7 X

FOREIGN PATENTS 1,457,767   10/1965   France.

NICHOLAS S. RIZZO, Primary Examiner

J. H. TURNIPSEED, Assistant Examiner

U.S. Cl. X.R.

71—88, 94, 95; 260—297, 326; 424—264, 274, 278, 285